US012427542B2

(12) United States Patent
Wu

(10) Patent No.: US 12,427,542 B2
(45) Date of Patent: Sep. 30, 2025

(54) TREATMENT METHOD ON A SURFACE OF A PLASTIC FLOWERPOT

(71) Applicant: Zhejiang Dingsheng Outdoor Living Products Co., Ltd., Zhejiang (CN)

(72) Inventor: Yuxuan Wu, Taizhou (CN)

(73) Assignee: Zhejiang Dingsheng Outdoor Living Products Co., Ltd., Taizhou (CN)

( * ) Notice: Subject to any disclaimer, the term of this patent is extended or adjusted under 35 U.S.C. 154(b) by 7 days.

(21) Appl. No.: 18/671,285

(22) Filed: May 22, 2024

(65) Prior Publication Data

US 2025/0276343 A1 Sep. 4, 2025

(30) Foreign Application Priority Data

Mar. 4, 2024 (CN) ........................ 202410242003.X

(51) Int. Cl.

*B05D 1/04* (2006.01)
*B05B 5/025* (2006.01)
*B05D 1/36* (2006.01)

(52) U.S. Cl.

CPC .............. *B05D 1/045* (2013.01); *B05B 5/025* (2013.01); *B05D 1/36* (2013.01); *B05D 2203/30* (2013.01); *B05D 2508/00* (2013.01)

(58) Field of Classification Search

CPC .......... B05D 1/045; B05D 5/025; B05D 1/36; B05D 2203/30; B05D 2508/00
See application file for complete search history.

(56) References Cited

U.S. PATENT DOCUMENTS 5,565,240 A * 10/1996 Smith .................. B05D 3/0218 427/195

FOREIGN PATENT DOCUMENTS

| | | | | |
|---|---|---|---|---|
| EP | 0353932 A1 * | 2/1990 | .............. | C08J 7/042 |
| KR | 200390130 Y1 * | 7/2005 | ............... | B05D 1/18 |
| WO | WO-9407612 A1 * | 4/1994 | ............. | B05D 1/045 |

* cited by examiner

*Primary Examiner* — William P Fletcher, III
(74) *Attorney, Agent, or Firm* — Wang Law Firm, Inc.

(57) ABSTRACT

A treatment method on a surface of a plastic flowerpot includes: directly spraying an undercoat on the surface of the plastic flowerpot without pretreatment; or, during a production of the plastic flowerpot, adding conductive carbon black to a master batch, without pretreatment or spraying the undercoat; spraying a conductive liquid; spraying plastic powder of a color through a high-pressure electrostatic spray gun, and thermally curing; and naturally cooling.

6 Claims, 1 Drawing Sheet

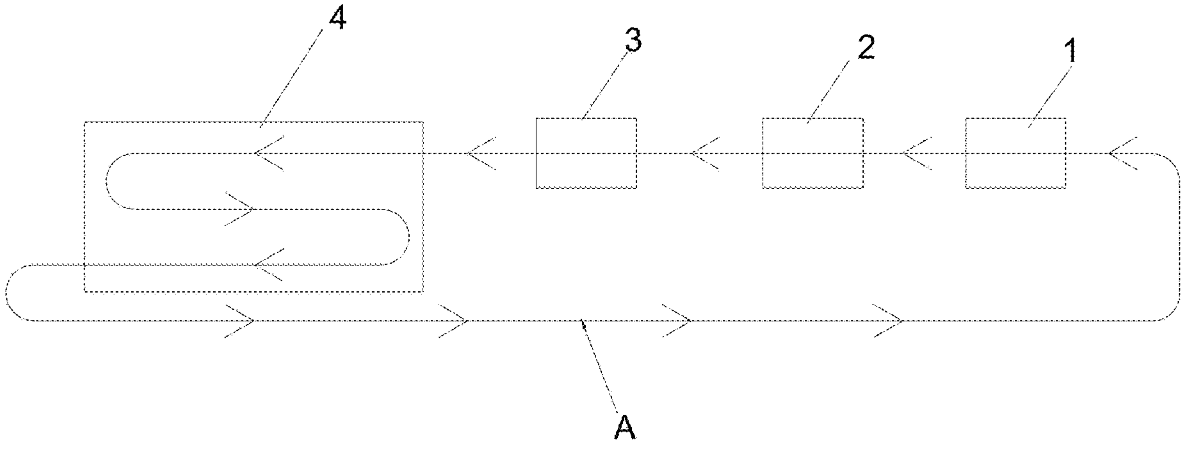
4
3
2
1
A

TREATMENT METHOD ON A SURFACE OF A PLASTIC FLOWERPOT

TECHNICAL FIELD OF THE INVENTION

The present invention relates to a field of treatment methods on a surface of a plastic product, and in particular to a treatment method on a surface of a plastic flowerpot.

BACKGROUND OF THE INVENTION

Treatment method on a surface is to form a surface having one or more special properties on a surface of a material by a physical or chemical method. Surfaces of most plastic products such as PP (Polypropylene), PE (Polyethylene), ABS (Acrylonitrile Butadiene Styrene), PPR (Polypropylene Random) and RA (Polyamide) need to be subjected to treatment in order to improve appearance, texture function and other properties of the plastic products.

The existing conventional treatment methods on a surface of plastic products include: electroplating, vacuum coating, painting and dipping. Since plastics have high crystallinity and low or no polarity, plastic products have low surface energy, so that the adhesion of treated surface will be affected. Moreover, since plastics are non-conductive insulators, a pretreatment on a surface of the plastics is needed before the conventional treatment methods such as electroplating and vacuum coating are used on a surface of the plastics. The pretreatment methods mainly comprise: mechanical roughening, chemical degreasing, chemical roughening, sensitization, activation, reduction or the like. The pretreatment is to improve the adhesion of the treated surface and form a conductive metal layer. However, due to its complicated production process, high production cost and low production efficiency, the pretreatment can only be applied to small parts and small-scale production, and is difficultly applied to large parts and large-scale production, and it is difficult to solve the environmental problem. However, for painting and dipping, although the production process is relatively simple, the pretreatment on a surface of the plastics is also needed, and the environmental problem is maintained to be solved, heavy metal elements are easy to be over-standard.

SUMMARY OF THE INVENTION

It is an object of the present invention to provide a treatment method on a surface of a plastic flowerpot, which is simple in process, low in production cost, energy-saving and environmental-friendly, and feasible for large-scale production.

For achieving the above object, the treatment method on a surface of a plastic flowerpot comprises:

a) directly spraying an undercoat on the surface of the plastic flowerpot without pretreatment;

or, during a production of the plastic flowerpot, adding a proper amount of conductive carbon black to a master batch, without pretreatment or spraying the undercoat;

b) spraying a conductive liquid;

c) spraying plastic powder of a required color through a high-pressure electrostatic spray gun, and thermally curing; and d) naturally cooling.

Preferably, the steps a, b, and c are carried out on an automatic production line, the automatic production line has an undercoat spraying section, a conductive liquid spraying section, a plastic powder spraying section and a thermal curing section arranged sequentially on the automatic production line.

Preferably, the undercoat in the step a, the conductive liquid in the step b and the plastic powder in the step c are green environmental-friendly materials.

Preferably, the thermal curing described in the step c is conveying the plastic flowerpot through a drying room at 125±5° C. for 15 to 25 minutes.

Preferably, the material of plastic flowerpot is PP, or PE, or ABS, or PPR, or PA or synthetic material using various plastics as base stock.

Preferably, the undercoat comprises the following chemical components: 60 to 70 parts of epoxy resin, 10 to 15 parts of butyl acetate, 6 to 10 parts of xylene and 10 to 20 parts of chlorinate polyolefin, wherein the total amount of the chemical components of the undercoat is 100 percentages.

Preferably, the conductive liquid comprises the following chemical components: 10 to 50 parts of polyaniline, 25 to 35 parts of ITO and 20 to 30 parts of nano-silver, wherein the total amount of the chemical components of the conductive liquid is 100 percentages.

Preferably, the plastic powder comprises the following chemical components: 56 to 66 parts of polyester resin, 2 to 8 parts of a curing agent, 2 to 12 parts of an auxiliary agent, a plasticizer, a stabilizer and a lubricant, and 20 to 35 parts of a pigment and a filler, wherein the total amount of the chemical components of the plastic powder is 100 percentages.

Compared with the prior art, the present invention has the following advantages.

Without any complicated pretreatment process, the undercoat is directly sprayed on the surface of the plastic flowerpot; or, during the production of the plastic flowerpot, a proper amount of conductive carbon black is added to the master batch, without pretreatment and spraying the undercoat; and then, the conductive liquid is sprayed, and the plastic powder of a required color is sprayed and thermally cured. The present invention is simple in process, low in production cost and high in production efficiency, and all processes are free of pollution and environmental-friendly and can be completed on the automatic production line, so that it is feasible to be applied to large-area and large-scale production.

BRIEF DESCRIPTION OF THE DRAWINGS

FIG. 1 is a process flow diagram of a treatment method on a surface of a plastic flowerpot of the present invention.

DETAILED DESCRIPTION OF THE INVENTION

The present invention will be further described below in detail by embodiments with reference to the accompanying drawings.

Embodiment 1

As shown in FIG. 1, the treatment method on a surface of a plastic flowerpot comprises:

a) directly spraying an undercoat on the surface of the plastic flowerpot without pretreatment, wherein the undercoat comprises the following chemical components: 65% of epoxy resin, 12% of butyl acetate, 8% of xylene and 15% of chlorinate polyolefin, wherein the total amount of the chemical components of the undercoat is 100 percentages.

b) spraying a conductive liquid, wherein the conductive liquid comprises the following chemical components: 45% of polyaniline, 30% of ITO and 25% of nano-silver (in mass percentage).

c) spraying plastic powder of a required color through a high-pressure electrostatic spray gun, and thermally curing, wherein the plastic powder comprises the following chemical components: 61% of polyester resin, 4% of a curing agent, 7% of an auxiliary agent, a plasticizer, a stabilizer and a lubricant, and 28% of a pigment and a filler (in mass percentage), and thermal curing is conveying the plastic flowerpot through a drying room at 125±5° C. for 15 to 25 minutes.

d) naturally cooling.

The steps a, b, and c are carried out on an automatic production line A, the automatic production line has an undercoat spraying section 1, a conductive liquid spraying section 2, a plastic powder spraying section 3 and a thermal curing section 4 arranged sequentially on the automatic production line.

The undercoat in the step a, the conductive liquid in the step b and the plastic powder in the step c are green environmental-friendly materials.

Additionally, the material of plastic flowerpot is PP, or PE, or ABS, or PPR, or PA or synthetic material using various plastics as base stock.

During production, the plastic flowerpot is placed on the automatic production line A, and is sequentially sprayed with the undercoat in the undercoat spraying section 1, the conductive liquid in the conductive liquid spraying section 2, the plastic powder of a required color in the plastic powder spray section 3, conveyed through the drying room at 125° C. for 20 minutes in the thermal curing section 4 and finally naturally cooled, so that the treated surface with the required color is obtained.

Embodiment 2

A treatment method on a surface of a plastic flowerpot comprises:

a) during a production of the plastic flowerpot, adding a proper amount of conductive carbon black to a master batch, without pretreatment or spraying the undercoat;

b) spraying a conductive liquid on the surface of the flowerpot;

c) spraying plastic powder of a required color, and thermally curing; and d) naturally cooling.

Other situations are similar to those in Embodiment 1.

After this production process is completed, the firmness (adhesion) of the plastic powder on the surface of the plastic flowerpot is up to I-class standard (100% qualified after being tested by a Cross-Cut tester); the surface of the plastic flowerpot passes through 2H standard test of hardness abrasion; and, the surface of the plastic flowerpot passes through 40 CM positive impact test of impact resistance.

Since the complicated pretreatment process is not required in the present invention, the process is greatly simplified, the production cycle is shortened, the production efficiency is improved, and the production cost is reduced. Moreover, the production process is energy-saving and environmental-friendly, and feasible to be applied to large-area and large-scale production.

The protection scope of the present invention is not limited to each embodiment described in this description. Any changes and replacements made on the basis of the scope of the present invention patent and of the description shall be included in the scope of the present invention patent.

The invention claimed is:

1. A treatment method on the surface of a plastic flowerpot, comprising:

a) directly spraying an undercoat on the surface of the plastic flowerpot without pretreatment or, during a production of the plastic flowerpot, adding conductive carbon black to a master batch without pretreatment or spraying the undercoat;

b) spraying a conductive liquid;

c) spraying a colored plastic powder through an electrostatic spray gun;

d) thermally curing the colored plastic powder; and e) cooling, wherein the plastic powder comprises the following chemical components: 56 to 66 parts of polyester resin; 2 to 8 parts of a curing agent; 2 to 12 parts of an auxiliary agent, a plasticizer, a stabilizer, and a lubricant; and 20 to 35 parts of a pigment and a filler, wherein the total amount of the chemical components of the plastic powder is 100 percent.

2. The treatment method of claim 1, wherein the steps a, b, and c are carried out on an automatic production line, the automatic production line having an undercoat spraying section, a conductive liquid spraying section, a plastic powder spraying section and a thermal curing section arranged sequentially on the automatic production line.

3. The treatment method of claim 1, wherein the thermal curing described in the step c is conveying the plastic flowerpot through a drying room at 125±5° C. for 15 to 25 minutes.

4. The treatment method of claim 1, wherein the material for the plastic flowerpot is PP, PE, ABS, PPR, PA, or other synthetic material having a plastic base stock.

5. The treatment method of claim 1, wherein the undercoat comprises the following chemical components: 60 to 70 parts of epoxy resin, 10 to 15 parts of butyl acetate, 6 to 10 parts of xylene and 10 to 20 parts of chlorinated polyolefin, wherein the total amount of the chemical components of the undercoat is 100 percent.

6. The treatment method of claim 1, wherein the conductive liquid comprises the following chemical components: 10 to 50 parts of polyaniline, 25 to 35 parts of ITO and 20 to 30 parts of nano-silver, wherein the total amount of the chemical components of the conductive liquid is 100 percent.

* * * * *